United States Patent
Yamazaki et al.

(10) Patent No.: US 6,328,447 B1
(45) Date of Patent: *Dec. 11, 2001

(54) PROJECTION DEVICE

(75) Inventors: Katsunori Yamazaki, Matsumoto; Takashi Kurumisawa, Shiojiri; Yoichiro Suzuki, Okaya, all of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,352

(22) Filed: Dec. 2, 1998

(30) Foreign Application Priority Data

Dec. 3, 1997 (JP) .................................................. 9-333339
Oct. 1, 1998 (JP) ................................................. 10-280213

(51) Int. Cl.[7] .................................................. G03B 21/00
(52) U.S. Cl. ............................................................. 353/31
(58) Field of Search .................................... 359/483, 502, 359/618, 640, 487, 495, 497; 353/20, 31, 33

(56) References Cited

U.S. PATENT DOCUMENTS

| | | | |
|---|---|---|---|
| 5,278,680 | * 1/1994 | Karasawa et al. | 359/40 |
| 5,357,370 | * 10/1994 | Miyatake et al. | 359/495 |
| 5,597,222 | * 1/1997 | Doany et al. | 353/33 |
| 5,602,679 | * 2/1997 | Dolgoff et al. | 359/640 |
| 5,694,189 | * 12/1997 | Nakamura et al. | 359/143 |
| 5,828,488 | * 10/1998 | Ouderkirk et al. | 359/487 |
| 5,902,031 | * 5/1999 | Urabe | 353/31 |
| 5,934,778 | * 8/1999 | Shioya | 353/31 |
| 5,969,785 | * 10/1999 | Wu | 349/165 |

FOREIGN PATENT DOCUMENTS

| | | |
|---|---|---|
| 9-506985 | 7/1997 | (JP) . |
| WO 95/17303 | 6/1995 | (WO) . |
| WO 95/17691 | 6/1995 | (WO) . |
| WO 95/17692 | 6/1995 | (WO) . |
| WO 95/17699 | 6/1995 | (WO) . |
| WO 95/27919 | 10/1995 | (WO) . |
| WO 96/19347 | 6/1996 | (WO) . |
| WO 97/01439 | 1/1997 | (WO) . |
| WO 97/01440 | 1/1997 | (WO) . |
| WO 97/01610 | 1/1997 | (WO) . |
| WO 97/01726 | 1/1997 | (WO) . |
| WO 97/01774 | 1/1997 | (WO) . |
| WO 97/01778 | 1/1997 | (WO) . |
| WO 97/01780 | 1/1997 | (WO) . |
| WO 97/01781 | 1/1997 | (WO) . |
| WO 97/01788 | 1/1997 | (WO) . |
| WO 97/01789 | 1/1997 | (WO) . |
| WO 97/07653 | 2/1997 | (WO) . |

* cited by examiner

Primary Examiner—Safet Metjahic
Assistant Examiner—E P LeRoux
(74) Attorney, Agent, or Firm—Oliff & Berridge PLC

(57) ABSTRACT

As a polarization beam separating device constituting a projection device, a thin-film multilayer film (reflective polarizer) is used. The thin-film multilayer film is composed of a plurality of alternately stacked layers including layers having a refractive index in a predetermined direction and a refractive index in a direction perpendicular to the predetermined direction, the refractive indices being almost equal to each other, and layers having different refractive indices in a predetermined direction and in a direction perpendicular to the predetermined direction. The use of the reflective polarizer makes it possible to reflect linearly polarized light polarized in a first direction and to transmit linearly polarized light polarized in a second direction, which is perpendicular to the first direction, with respect to light of almost all wavelengths in the visible region. As a result, the contrast of an image to be projected can be improved.

17 Claims, 12 Drawing Sheets

FIG. 6B  COMMERCIAL PBS

| θ | WHITE | | | RED 649nm | | | GREEN 555nm | | | BLUE 460nm | | |
|---|---|---|---|---|---|---|---|---|---|---|---|---|
|  | TRANS | REFL | RATIO | TRANS | REFL | RATIO | TRANS | REFL | RATIO | TRANS | REFL | RATIO |
| 0° |  |  |  |  |  |  |  |  |  |  |  |  |
| 5° |  |  |  |  |  |  |  |  |  |  |  |  |
| 10° |  |  |  |  |  |  |  |  |  |  |  |  |
| 15° |  |  |  |  |  |  |  |  |  |  |  |  |
| 20° |  |  |  |  |  |  | 12.9 | 13 | 1 |  |  |  |
| 25° |  |  |  |  |  |  | 35.3 | 343 | 10 |  |  |  |
| 30° | 613 | 2,150 | 4 | 3.900 | 19.0 | 5 | 25.0 | 1,010 | 40 | 200.0 | 863 | 4 |
| 35° | 610 | 5,090 | 8 | 0.886 | 50.5 | 57 | 38.7 | 1,428 | 37 | 109.0 | 1,735 | 16 |
| 40° | 296 | 6,150 | 21 | 0.200 | 57.3 | 287 | 76.1 | 2,100 | 28 | 51.6 | 2,240 | 43 |
| 45° | 78 | 5,680 | 73 | 0.190 | 63.3 | 333 | 25.8 | 1,413 | 55 | 35.7 | 2,231 | 63 |
| 50° | 73 | 4,270 | 58 | 0.850 | 40.4 | 48 | 1.0 | 418 | 415 | 5.6 | 854 | 154 |
| 55° | 187 | 1,760 | 9 | 9.100 | 16.5 | 2 | 0.8 | 238 | 298 | 7.9 | 1,186 | 150 |
| 60° |  |  |  |  |  |  |  |  |  | 29.7 | 330 | 11 |

FIG. 6C  REFLECTIVE POLARIZER

| θ | WHITE | | | RED 649nm | | | GREEN 555nm | | | BLUE 460nm | | |
|---|---|---|---|---|---|---|---|---|---|---|---|---|
|  | TRANS | REFL | RATIO | TRANS | REFL | RATIO | TRANS | REFL | RATIO | TRANS | REFL | RATIO |
| 0° |  |  |  |  |  |  |  |  |  |  |  |  |
| 5° |  |  |  |  |  |  |  |  |  |  |  |  |
| 10° | 67 | 6,100 | 91 | 0.213 | 61.8 | 290 | 25.3 | 2,040 | 81 | 36.8 | 2,491 | 68 |
| 15° | 59 | 6,100 | 104 | 0.150 | 61.8 | 412 | 20.3 | 2,040 | 100 | 32.1 | 2,500 | 78 |
| 20° | 50 | 6,110 | 121 | 0.124 | 61.3 | 494 | 16.1 | 2,038 | 126 | 27.8 | 2,500 | 90 |
| 25° | 40 | 6,110 | 152 | 0.075 | 62.0 | 827 | 10.7 | 2,047 | 191 | 22.6 | 2,509 | 111 |
| 30° | 30 | 6,110 | 205 | 0.093 | 62.0 | 667 | 4.7 | 2,055 | 440 | 15.8 | 2,513 | 156 |
| 35° | 20 | 6,110 | 300 | 0.088 | 62.7 | 713 | 1.8 | 2,060 | 1121 | 10.7 | 2,515 | 236 |
| 40° | 13 | 6,100 | 475 | 0.130 | 62.2 | 478 | 0.8 | 2,061 | 2586 | 6.2 | 2,516 | 404 |
| 45° | 8 | 6,120 | 806 | 0.118 | 61.3 | 519 | 0.7 | 2,061 | 2843 | 4.0 | 2,515 | 632 |
| 50° | 4 | 6,110 | 1473 | 0.059 | 61.8 | 1047 | 0.3 | 2,051 | 7247 | 2.2 | 2,516 | 1153 |
| 55° |  |  |  |  |  |  |  |  |  |  |  |  |
| 60° |  |  |  |  |  |  |  |  |  |  |  |  |

UNIT OF BRIGHTNESS IS ARBITRARY

LINE WITH ■ OR ● SHOWS TRANSMISSION PROPERTY
LINE WITH □ OR ○ SHOWS REFLECTION PROPERTY.
LINE WITH NO MARK SHOWS RATIO

PROJECTION DEVICE

BACKGROUND OF THE INVENTION

1. Field of Invention

The present invention relates to a projection device using a polarization state changing means, such as a reflective liquid crystal light valve.

2. Description of Related Art

As a method of displaying a large image that measures more than 50 cm diagonally, a device for projecting a magnified image onto a screen by a small CRT, or by a means for projecting an image displayed by a display device having an illumination means, such as a liquid crystal device, via an optical system including a projection lens and the like (hereinafter these will be generically called projection means), namely, a projection device, is well known. In producing a display of the same size, this projection device can be substantially reduced in weight, compared with a large direct-view CRT, a liquid crystal device, and a plasma display device.

By using, as a small display, a liquid crystal display device that performs display by controlling the polarization state of incident light, the projection device can be further reduced in weight and size. In particular, a reflective liquid crystal display device, which performs display by reflecting incident light while controlling the polarization state thereof, has recently entered the spotlight, because the use thereof permits an increased aperture ratio of pixels, and thereby allows a brighter image to be easily obtained.

A brief description will now be given of the structure and operation of a projection device as this related art.

FIG. 12 is a view showing an example of the structure of a projection device as the related art. A projection device 100, shown in this figure, comprises an illumination device 110 for emitting linearly polarized light polarized in a first predetermined direction (s-polarized light or p-polarized light), a polarizing beam splitter 20 for reflecting the linearly polarized light polarized in the first direction and emitted from this illumination means, and for transmitting second linearly polarized light polarized in a direction perpendicular to the first direction (p-polarized light or s-polarized light), a dichroic prism 3 for color-separating the linearly polarized light polarized in the first direction and reflected by the polarizing beam splitter 20 and for color-synthesizing colored lights modulated by liquid crystal devices 4, 5, and 6, the reflective liquid crystal devices 4, 5, and 6, and a projection device 7 for magnifying and projecting incident light.

In this projection device 100, linearly polarized light polarized in the first direction and emitted from the illumination device 110 enters the polarizing beam splitter 20, is caused to change its direction of travel by 90°, and enters the dichroic prism 3. Specifically, the polarizing beam splitter 20 is a well-known type of polarizating beam splitter formed by attaching multilayer thin films on inclined surfaces of two right-angled prisms and bonding these prisms.

Depending on the color of light incident from the side of the polarizing beam splitter 20, the dicbroic prism 3, for example, reflects red light to the right in FIG. 12, transmits green light, and reflects blue light to the left, namely, performs color separation. Conversely, red light that is incident from the right side of the dichroic prism 3 in FIG. 12 and blue light that is incident from the left side are reflected upward, and green light that is incident from the bottom side is unchanged and transmitted upward, whereby color synthesis is performed.

The reflective liquid crystal dices 4 to 6 correspond to red, green, and blue images, and reflect incident linearly polarized light polarized in the first predetermined direction while changing (modulating) the direction thereof according to an image to be displayed. That is, the reflective liquid crystal devices 4 to 6 reflect incident light while converting the incident light into linearly polarized light polarized in the second predetermined direction for a bright display, reflect the incident light unchanged as it remains linearly polarized light polarized in the first predetermined direction for a dark display, and reflect incident light for middle tones while increasing or reducing linearly polarized light polarized in the second predetermined direction.

Colored lights reflected by the reflective liquid crystal devices 4 to 6 are color-synthesized by the dichroic prism 3, and reach the polarizing beam splitter 20. Then, only linearly polarized light polarized in the second predetermined direction passes through the polarizing beam splitter 20, and reaches the projection device 7, whereby a magnified image is projected by the projection device 7 onto, for example, a screen (not shown).

The optical path of light emitted from the illumination device 110 is as mentioned above, and shown by the arrows in the figure.

As mentioned above, when reflective liquid crystal devices are used, the dichroic prism 3 is allowed to serve two functions, color separation and color synthesis, which can make the projection device compact. Moreover, it is possible to increase the aperture ratio of pixels of the liquid crystal devices, as mentioned above, and to thereby produce a bright display.

In the polarizing beam splitter having the conventional structure, however, the degree to which the polarizing beam splitter reflects linearly polarized light polarized in the first direction (e.g., s-polarized light), and the degree to which the polarizing beam splitter transmits linearly polarized light polarized in the second direction (e.g., p-polarized light) vary according to the incident angle and wavelength of light that is incident thereon. Since light emitted from the illumination device has many wavelengths and is not completely parallel, a part of linearly polarized light polarized in the first direction, all of which should be essentially reflected by the polarizing splitter, is transmitted, and a part of linearly polarized light polarized in the second direction is reflected. Therefore, undesirable polarized light mixes into light that is incident on the projection device, which deteriorates the contrast of a display image to be projected.

SUMMARY OF THE INVENTION

The present invention has been made in view of such problems, and the present invention improves the display contrast of an image to be projected by a projection image.

In order to solve the above problems, a projection device of the present invention includes an illumination device; a polarizing beam splitter that reflects linearly polarized light polarized in a first direction, of light emitted from the illumination device, and that transmits linearly polarized light polarized in a second direction that is different from the first direction; a polarization direction changing element that reflects the linearly polarized light, polarized in the first direction and reflected by the polarizing beam splitter, toward the polarizing beam splitter while changing the polarization direction thereof; and a projection device for magnifying and projecting the linearly polarized light reflected by the polarization direction changing element and passing through the polarizing beam splitter, wherein a thin-film multilayer film (reflective polarizer) is used as the polarizing beam splitter and is composed of a plurality of first layers and a plurality of second layers alternately stacked, a first refractive index of the first layers in a predetermined direction and a second refractive index of the first layers in a direction different from the first direction being almost equal to each other, and the refractive indices of the second layers in the predetermined direction and in the direction different than the predetermined direction being different from each other.

Since the projection device of the present invention employs such a reflective polarizer as the polarizing beam splitter, it is possible to reflect linearly polarized light polarized in a first direction (s-polarized light or polarized light) and to transmit second linearly polarized light (p-polarized light or s-polarized light) with respect to light of almost all wavelengths in the visible region. This allows polarized light, in which few polarized light components of other types are mixed, to be guided to the polarization direction changing element, and therefore, the contrast of an image to be projected is improved.

When the present invention is applied to a projection device that projects a color image by using an illumination device having a light-source lamp and a reflector, and a single polarization direction changing element, it is preferable to use the following polarization direction changing element. That is, it is preferable to use a polarization direction changing element having a dichroic color filter that selectively transmits a predetermined colored light contained in linearly polarized light reflected by the polarizing beam splitter (reflective polarizer), that guides the colored light to a pixel electrode, and that reflects other colored lights.

When the polarization direction changing element having such a dichroic color filter is used, only a colored light of linearly polarized light that is incident on the dichroic color filter is transmitted and guided to a corresponding pixel electrode, and other colored lights are reflected by the dichroic color filter, and returned to the reflective polarizer. Since these colored lights that have returned to the reflective polarizer are linearly polarized in the first direction, they are reflected again by the reflective polarizer and guided to the illumination device. The linearly polarized light polarized in the first direction and guided to the illumination device is reflected again by the reflector in the illumination device toward the reflective polarizer. That is, the light reflected by the dichroic color filter is reused as light for image formation. This improves light utilization efficiency, and therefore, a bright image can be projected.

The projection device of the present invention may be applied to a projection device that separates light emitted from an illumination device into a plurality of colored lights. For example, the projection device of the present invention may be applied to a projection device that includes a color separator for separating linearly polarized light reflected by the polarizing beam splitter into three colored lights, three polarization direction changing elements corresponding to the colored lights separated by the color separator, and a color synthesizer for synthesizing the colored lights reflected by these polarization direction changing elements and for guiding the synthesized light to the polarizing beam splitter.

By incorporating, in the projection device, a polarization conversion unit for converting light emitted from the illumination device into linearly polarized light polarized in the first direction, regardless of the above two types, almost all components of the light emitted from the illumination device can be converted into linearly polarized light polarized in the first direction, and this linearly polarized light can be used as light for image formation. As a result, light utilization efficiency is further improved, and a brighter image can be projected.

It is preferable that the projection device of the present invention have a light guide system for converting light passing through the reflective polarizer into linearly polarized light polarized in the second direction and for returning the light to the reflective polarizer. Since it is difficult for the reflective polarizer to have a perfect polarizing beam splitting ability, there is a possibility that not only linearly polarized light polarized in the second direction, but also a part of linearly polarized light polarized in the first direction will pass through the reflective polarizer. In the projection device of the present invention, such light is returned to the reflective polarizer by the light guide system. Since the light returned to the reflective polarizer is a linearly polarized light component polarized in the second direction, it passes through the reflective polarizer, and is guided to the polarization conversion unit, where the polarization thereof is converted, that is, the light is converted into a linearly polarized component polarized in the first direction. Since the light is reflected by the reflector in the illumination device after being converted, it can be used as light for image formation. The light passing through the reflective polarizer can thus be efficiently used, and therefore, a brighter projection image can be obtained.

As the light guide system, a light guide system including the aforesaid thin-film multilayer film, a quarter-wave plate, and a reflecting mirror, which are arranged on the optical axis of light passing through the reflective polarizer, may be adopted. In this case, the thin-film multilayer film is placed so that its reflection axis intersects the reflection axis of a thin-film multilayer film that is used as the polarizing beam splitter. In such a guide system, a linearly polarized light component polarized in the second direction, of the light passing through the reflective polarizer, is reflected by the thin-film multilayer film, and returns to the reflective polarizer. A linearly polarized component polarized in the first direction is converted into a linearly polarized light component polarized in the second direction by the $\lambda/4$ phase plate and the reflecting mirror, passes through the thin-film multilayer film, and returns to the reflective polarizer. This light that has returned to the reflective polarizer passes through the reflective polarizer, is subjected to polarization conversion by the polarization conversion unit, and is used as light for image formation.

As the polarization conversion unit, for example, a common type of polarization conversion unit composed of a polarizing beam splitter, a reflecting mirror, and a $\lambda/2$ phase plate may be used. However, such a unit is an optical unit that is constituted by a combination of a plurality of optical elements, and therefore, the projection device is likely to become large.

The thin-film multilayer film serving as the reflective polarizer has the functions of transmitting only one of the linearly polarized lights and of reflecting the other linearly polarized light, as mentioned above. On the other hand, the linearly polarized light reflected by the reflective polarizer is allowed to be reflected by the reflector in the illumination device and to reach the reflective polarizer again.

Therefore, when the reflective polarizer is disposed on the emergent side of the illumination device, linearly polarized light polarized in the second direction, of light emitted from the illumination device, undergoes multiple reflection between the reflective polarizer and the reflector. During such multiple reflection, the second linearly polarized light is subjected to a rotatory polarization action, and converted into linearly polarized light polarized in the first direction. Therefore, when the reflective polarizer is disposed on the emergent side of the illumination device, it practically functions as a polarization conversion unit. Since the reflective polarizer is formed of a thin-film multilayer film, the use of this reflective polarizer as a polarization conversion unit makes it possible to prevent the projection device having the polarization conversion unit incorporated therein from becoming large.

Considering that the linearly polarized light undergoes a rotatory polarization action during multiple reflection, light utilizing efficiency of the projection device, in which the polarization conversion unit is not incorporated, can be improved only by incorporating the aforesaid light guide system. That is, light passing through the reflective polarizer undergoes multiple reflection between the light guide system and the reflector in the illumination device, and is thereby converted into linearly polarize light polarized in the first direction. After conversion, the linearly polarized light is guided to the polarization direction changing element by the reflective polarizer. Accordingly, light passed through the reflective polarizer can be used as light for image formation.

BRIEF DESCRIPTION OF THE DRAWINGS

FIGS. 6(a) and 6(b) are views showing the reflection and transmission properties of a commercial polarizing beam splitter and the reflective polarizer with respect to the incident angle of light.

DETAILED DESCRIPTION OF PREFERRED EMBODIMENTS

Embodiments of the present invention will be described below with reference to the drawings.

Figure 1:
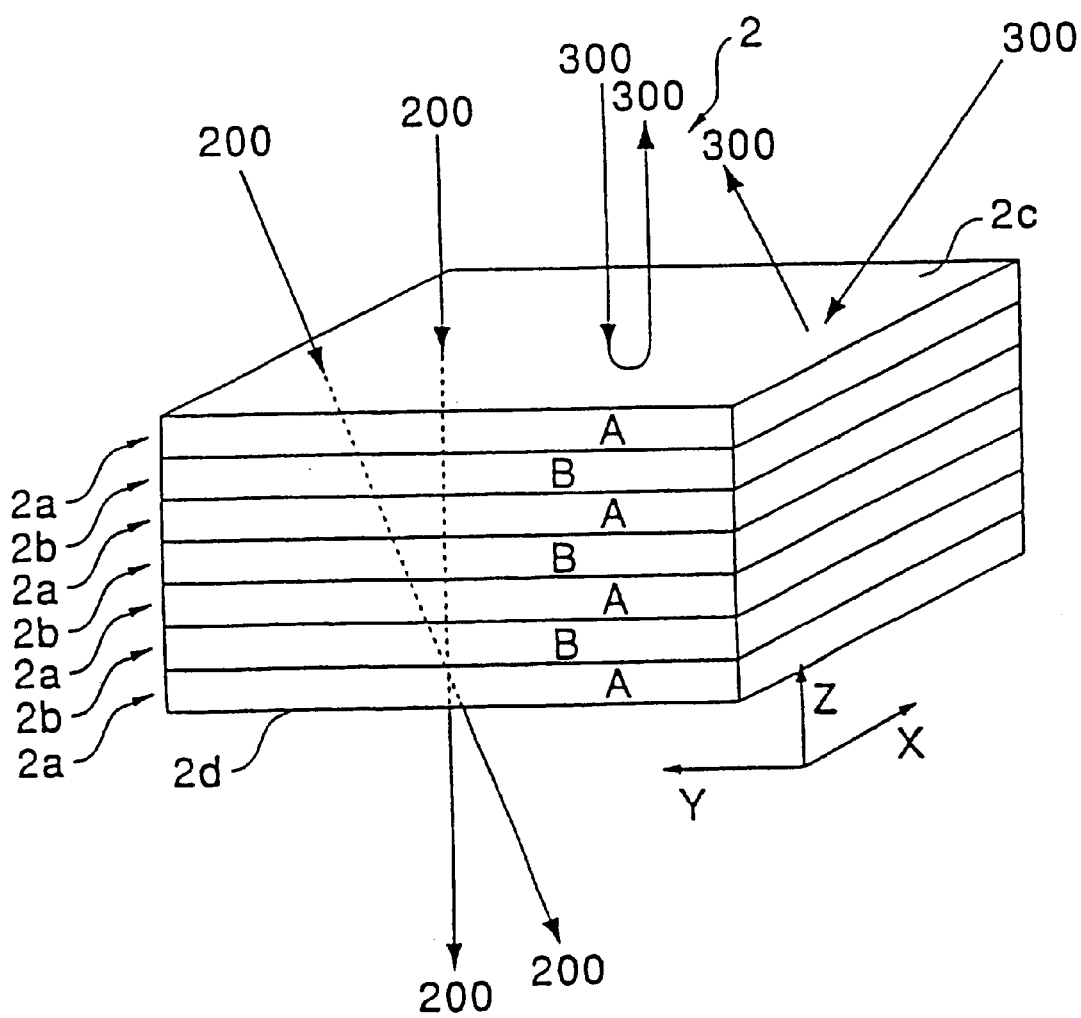
FIG. 1 is a schematic structural perspective view of a reflective polarizer.

The principle of a reflective polarizer will now be described with reference to FIG. 1. FIG. 1 is a schematic structural perspective view of the reflective polarizer. A reflective polarizer 2 has a structure in which a plurality of A layers (first layers) 2a and B layers (second layers) 2b are alternately stacked. In the reflective polarizer 2, the refractive index of the A layers 2a in the X-direction (first refractive index nAX) and the refractive index in the Y direction (second refractive index nAY) are different from each other, and the refractive index of the B layers 2b in the X-direction (first refractive index nBX) and the refractive index in the Y direction (second refractive index nBY) are equal to each other. The refractive index of the A layers 2a in the Y direction (nAY) and the refractive index of the B layers 2b in the Y direction (nBY) are equal to each other.

Therefore, linearly polarized light 200 polarized in the Y direction, of light that is incident on a top face 2c of the reflective polarizer 2, passes through the reflective polarizer 2 without depending on the incident angle with respect to the top face 2c, and emerges from a bottom face 2d of the reflective polarizer 2 remaining as the linearly polarized light 200 polarized in the Y direction. That is, the linearly polarized light 200 polarized in the Y direction passes through the reflective polarizer 2. When the linearly polarized light 200 polarized in the Y direction is incident from the bottom face 2d of the reflective polarizer 2, it also passes through the reflective polarizer 2, and emerges unchanged from the top face 2c. Hereinafter, the Y direction is referred to as a transmission axis.

On the other hand, when the thickness of the A layers 2a is designated tA, the thickness of the B layers 2b is designated tB, and the wavelength of incident light is designated λ, and when the following expression (1) is satisfied, linearly polarized light 300 polarized in the X-direction, of light having the wavelength λ, that is incident on the top face 2c of the reflective polarizer 2, does not depend on the incident angle with respect to the top face 2c and is reflected by the reflective polarizer 2 without undergoing a rotatory polarization action. When the linearly polarized light 300 polarized in the X-direction is incident from the bottom face 2d of the reflective polarizer 2, it is also reflected without undergoing a rotatory polarization action. While FIG. 1 shows a state in which the linearly polarized light 300 polarized in the X-direction is reflected by the top face 2a, the linearly polarized light 300 may be reflected by any interface surface between the A layer 2a and the B layer 2b inside the reflective polarizer 2. Hereinafter, the X-direction is referred to as a reflection axis.

$$tA \cdot nAX + tB \cdot nBX = \lambda/2 \tag{1}$$

For this reason, when the expression (1) is satisfied over all wavelengths of visible light by changing the thickness tA of the A layers 2a and the thickness tB of the B layers 2b, it is possible to obtain a reflective polarizer 2 that reflects unchanged the linearly polarized light 300 polarized in the X-direction and transmits unchanged the linearly polarized light 200 polarized in the Y direction. Of course, when the reflective polarizer 2 is placed so that the Y direction serves as a reflection axis and the X-direction serves as a transmission axis, it can reflect unchanged the linearly polarized light 200 polarized in the Y direction and transmit unchanged the linearly polarized light 300 polarized in the X-direction.

Figure 2:
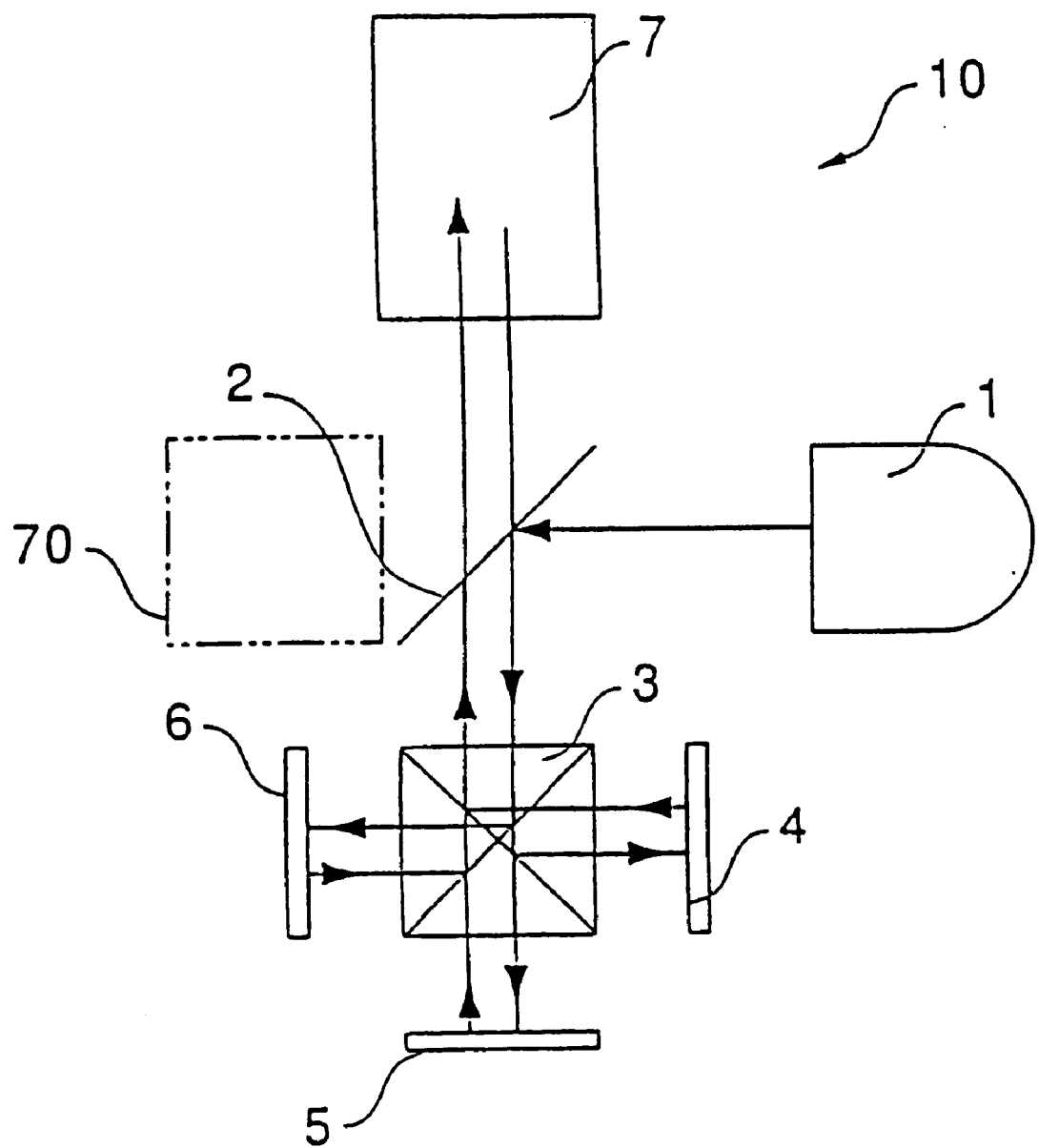
FIG. 2 is a schematic structural view of an optical system in a projection device according to a first embodiment of the present invention.

FIG. 2 is a view showing an example of the structure of a projection device of the present invention. Arrows in this figure represent the optical paths of light emitted from an illumination device 1. A projection device 10 shown in this figure includes the illumination device 1, a polarization separating element (reflective polarizer) 2 for reflecting linearly polarized light polarized in a first direction (hereinafter referred to as s-polarized light) and transmitting second linearly polarized light polarized in a direction perpendicular to the first direction (hereinafter referred to as P-polarized light), a dichroic prism 3 for performing color separation and color synthesis, three reflective liquid crystal devices 4, 5, and 6, and a projection device 7 for magnifying and projecting incident light.

Figure 3:
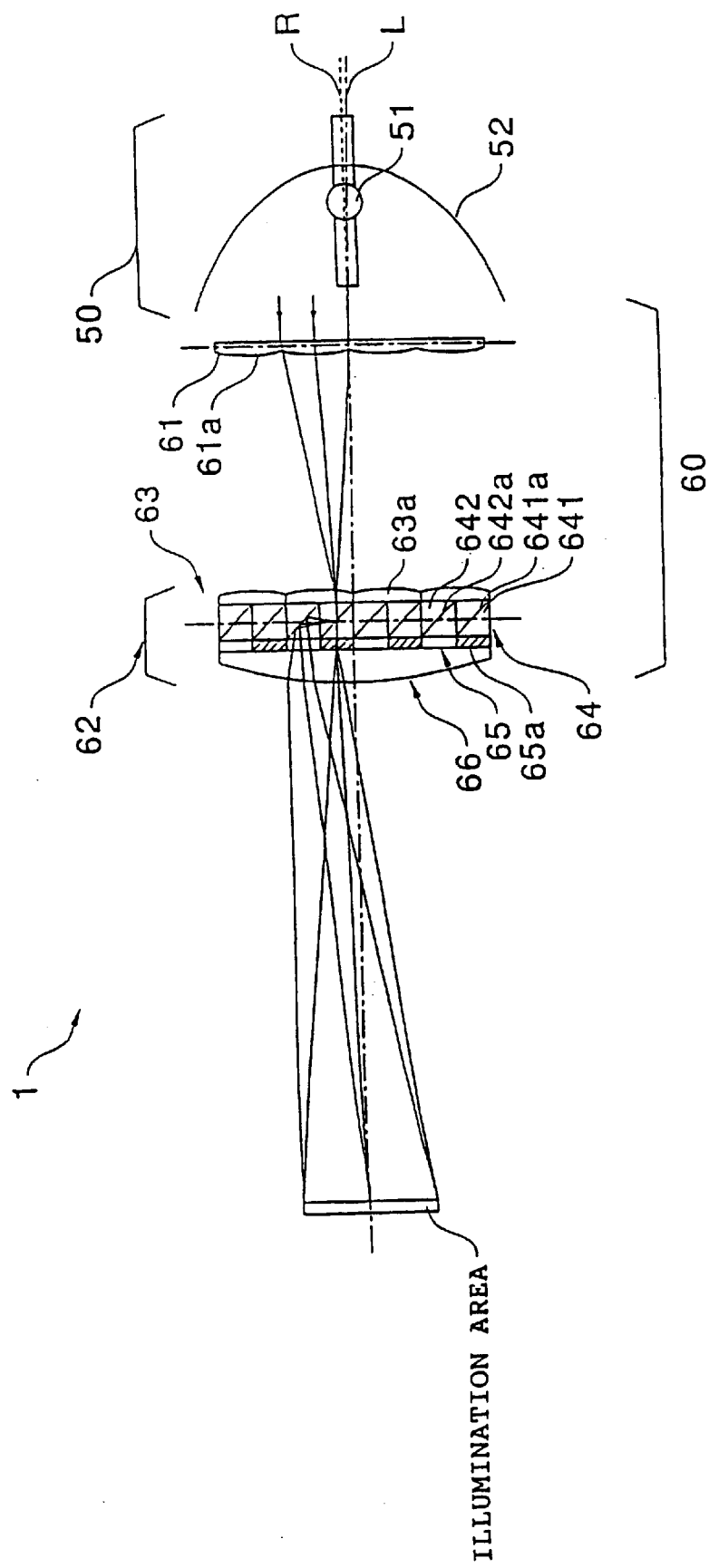
FIG. 3 is a view showing an example of an illumination device in the projection device shown in FIG. 2.

FIG. 3 is a schematic structural view of the illumination device 1. The illumination device 1 is a polarizing illumination device for emitting s-polarized light, and generally comprises a light source 50 and a polarizing conversion element 60 arranged along a system optical axis L. Light emitted from the light source 50 is converted into one type of polarized light polarized in the same direction (in this embodiment, s-polarized light) during the process of passing through the polarizing conversion unit 60, and reaches an illumination area, namely, areas of the liquid crystal devices 4 to 6 to be illuminated.

The light source 50 includes a lamp body 51 formed of a metal halide lamp or the like, and a reflector 52 for reflecting randomly polarized light radiated from the lamp body 51 and emitting the light as nearly parallel light. Randomly polarized light reflected by the reflector 52 enters the polarizing conversion element 60. A light-source optical axis R is inclined at a predetermined angle with respect to the system optical axis L.

The polarizing conversion element 60 generally comprises a first lens plate 61 and a second lens plate 62. The first lens plate 61 is composed of a plurality of light-collecting rectangular microlenses 61a having a rectangular outline and arranged in rows and columns. Light that is incident on the first lens plate 61 forms the same number of focal images as that of the light-collecting rectangular microlenses 61a by a light-collecting function of the light-collecting rectangular microlenses 61a.

The second lens plate 62 is a composite member composed of a light-collecting lens array 63, a polarizing beam splitter array 64, a selective phase plate 65, and an emergent-side lens 66, and is disposed near the positions where the aforesaid focal images are formed.

The light-collecting lens array 63 has a structure similar to that of the first lens plate 61. That is, in the light-collecting lens array 63, the same number of light-collecting rectangular lenses 63a as that of the light-collecting rectangular microlenses 61a constituting the first lens plate 61 are arranged in rows and columns. These light-collecting rectangular lenses 63a also have a light-collecting function, similar to the light-collecting rectangular microlenses 61a.

The base unit of the polarizing beam splitter array 64 is a pair of polarizing beam splitters 641 that are formed of a prism assembly in the shape of a rectangular prism and has a polarization separating film 641a therein, and a reflecting mirror 642 that is formed of a prism assembly in the shape of a rectangular prism and has a reflecting film 642a therein. The polarizing beam splitter array 64 is composed of a plurality of such pairs that are arranged in a plane. In this polarizing beam splitter array 64, the pairs serving as the base units are regularly arranged so that one pair corresponds to a light-collecting rectangular microlens 63a of the light-collecting lens array 63. In this embodiment, focal images formed by the first lens plate 61 are positioned at the polarization beam separating films 641a of the polarizing beam splitters 641.

Randomly polarized light that is incident on the polarizing beam splitter array 64 is separated into two types of polarized light polarized in different directions, p-polarized light and s-polarized light, by the polarizing beam splitters 641. P-polarized light passes unchanged through the polarizing beam splitters 641 without changing its direction of travel. On the other hand, s-polarized light is reflected by the polarization separating film 641a so that its direction of travel is changed about 90°, is reflected by the reflecting film 642a of the adjoining reflecting mirror 642 so that its direction of travel is changed 90°, and emerges from the polarizing beam splitter array 64 nearly in parallel with the p-polarized light.

On the emergent side of the polarizing beam splitter array 64, the selective phase plate 65 is disposed, in which λ/2 phase layers 65a are regularly arranged. That is, the λ/2 phase layers 65a are disposed only on the emergent surfaces of the polarizing beam splitters 641 that constitute the polarizing beam splitter array 64, and are not disposed on the emergent surfaces of the reflecting mirrors 642. According to such an arrangement state of the λ/2 phase layers 65a, p-polarized light emerging from the polarizing beam splitter 641 is subjected to a rotatory polarization action when passing through the λ/2 phase layer 65a, and is thereby converted into s-polarized light. On the other hand, since s-polarized light emerging from the reflecting mirror 642 does not pass through the λ/2 phase layer 65a, its direction of polarization does not change, and the s-polarized light passes through the selective phase plate 65 remaining as an s-polarized light beam. As a result, randomly polarized light is converted into one type of polarized light (in this case, s-polarized light).

The light thus united into s-polarized light is guided by the emergent-side lens 66 to an illumination area, namely, areas of the liquid crystal devices 4 to 6 to be illuminated, and superimposed on the areas.

As shown in FIG. 2, the reflective polarizer 2 is set so as to reflect s-polarized light emitted from the illumination device 1 so that the direction of travel of the s-polarized light is changed by 90°, and to transmit p-polarized light. This reflective polarizer 2 is placed at an inclined angle of 45° with respect to the optical axis of emergent light from the illumination device 1. S-polarized light emitted from the illumination device 1 is caused by the reflective polarizer 2 to change its direction of travel by 90°, and enters the dichroic prism 3.

According to the color of incident light from the side of the reflective polarizer 2, for example, the dichroic prism 3 reflects red light to the right side in FIG. 2, transmits green light, and reflects blue light to the left side, namely, the dichroic prism 3 performs color separation. Conversely, red light that is incident from the right side of the dichroic prism 3 in FIG. 2 and blue light that is incident from the left side are reflected upward, and green light that is incident from the bottom side is transmitted upward, whereby color synthesis is performed. In this way, the dichroic prism 3 in the projection device 1 of this embodiment fictions as both a color separation device and a color synthesizing device. Colored light separated by the dichroic prism 3 enter the corresponding reflective liquid crystal devices 4, 5, and 6.

Figure 4:
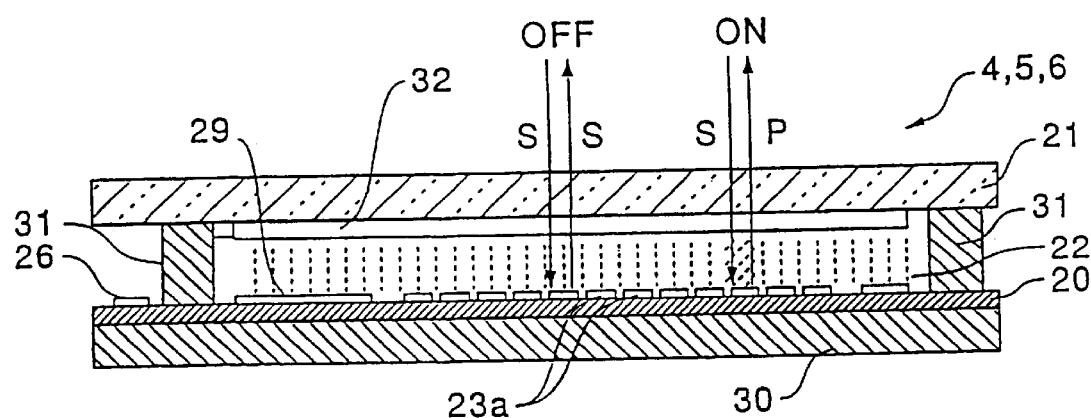
FIG. 4 is a schematic structural cross-sectional view showing an example of a liquid crystal device in the projection device shown in FIG. 2.
Figure 5:
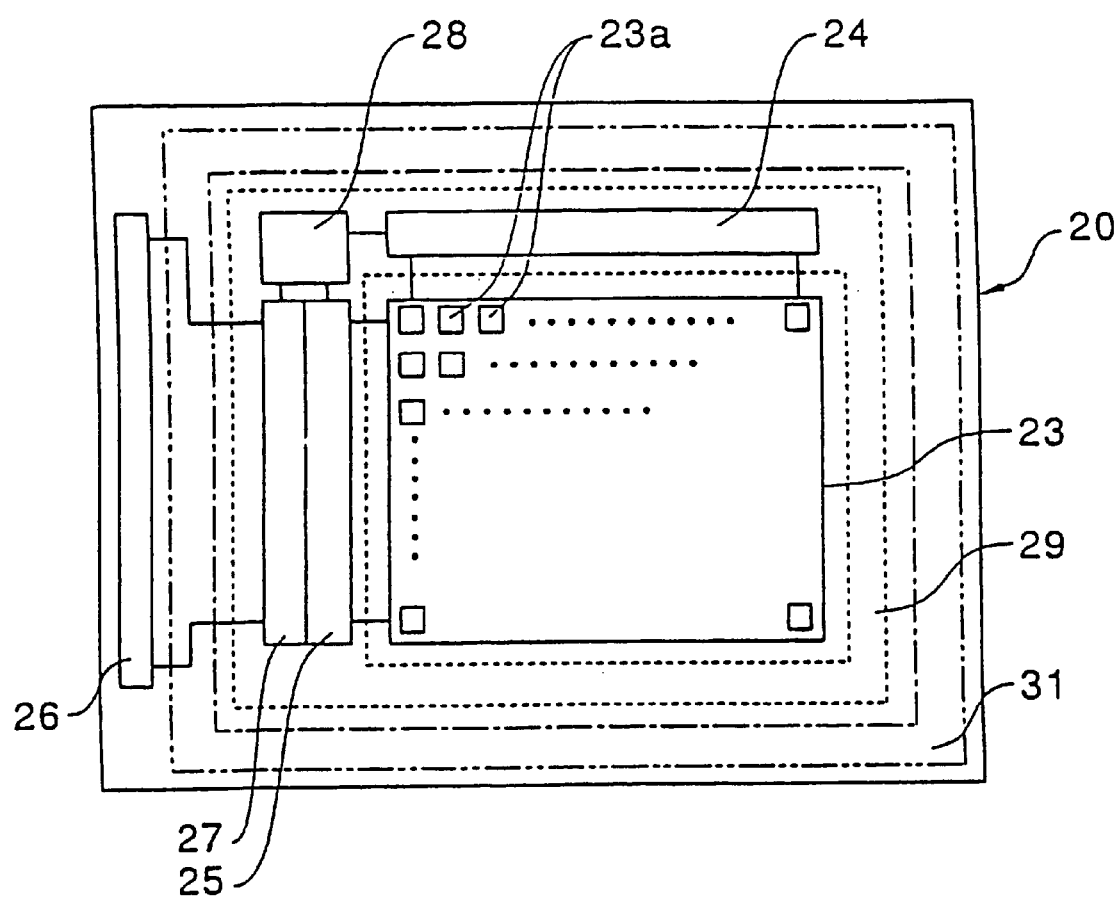
FIG. 5 is a plan view showing a substrate surface of a liquid crystal panel substrate in the liquid crystal device shown in FIG. 4.

FIG. 4 shows an example of the reflective liquid crystal devices 4 to 6. FIG. 5 is a plan view of a substrate surface of a liquid crystal panel substrate that is a constituent of the liquid crystal devices 4 to 6. The liquid crystal devices 4 to 6 have a liquid crystal panel substrate 20, and a glass substrate 21. A liquid crystal layer 22 is sandwiched between these substrates 20 and 21.

The liquid crystal panel substrate 20 is formed of, for example, a silicon substrate. On the front side thereof, a plurality of pixel electrodes 23a are formed and arranged in a matrix. Formed around a rectangular pixel region 23, where these pixel electrodes 23a are formed, are a data line driving circuit 24 for supplying data lines with pixel signals according to image data, a gate line driving circuit 25 for sequentially scanning gate lines, an input circuit 27 for capturing image data input from the outside via a pad region 26, and a timing circuit 28 for controlling these circuits. The circuits 24, 25, 27, and 28 are covered with a light-shielding film 29. The pad region 26 is formed on the surface of the liquid crystal panel substrate 20 and outside a sealing member 31 that will be described later.

A support substrate 30 made of glass, ceramic or the like is fixedly bonded to the back side of the liquid crystal panel substrate 20. The glass substrate 21 is disposed on the front side of the liquid crystal panel substrate 20 at an appropriate interval, and the space between the liquid crystal panel substrate 20 and the glass substrate 21 is sealed by the sealing member 31. This sealed space is filled with SH (super homeotropic) liquid crystal, in which liquid crystal molecules align nearly vertically when voltage is not applied (off) and twist at about 90° when voltage is applied (on), thereby constituting the liquid crystal layer 22. A counter electrode 32 formed of a transparent conductive film (ITO), to which a common potential is applied, is formed on the glass substrate 21.

In such reflective liquid crystal devices 4 to 6, when the voltage applied between the pixel electrodes 23a and the counter electrode 32 is equal to or less than a threshold voltage of a liquid crystal (OFF), incident s-polarized light is reflected by the pixel electrode 23a while maintaining the polarization direction the same as that at the time of incidence, and is then emitted. On the other hand, when the applied voltage is more than the threshold voltage of a liquid crystal (ON), incident s-polarized light is reflected by the pixel electrode 23a and emitted in a manner similar to that of the OFF state. In the ON state, however, since the liquid crystal molecules in the liquid crystal layer 22 are twisted, s-polarized light is subjected to a rotatory polarization action, whereby light having the polarization direction shifted by about 90° from the polarization direction at the time of incidence, namely, p-polarized light, is emitted.

Therefore, the reflective liquid crystal devices 4 to 6 correspond to red, green, and blue images, and reflect incident s-polarized colored lights while changing the polarization directions thereof according to an image to be displayed. Specifically, light is reflected while being converted into linearly polarized light polarized in a second predetermined direction (p-polarized light) for a bright display section, and light is reflected unchanged as linearly polarized light polarized in a first predetermined direction (s-polarized light) for a dark section. For middle tones, light is reflected while increasing or reducing p-polarized light components.

Colored lights reflected by the reflective liquid crystal devices 4 to 6 are color-synthesized by the dicbroic prism 3, and reach the reflective polarizer 2. Then, only p-polarized light passes through the reflective polarizer 2, and reaches the projection device 7, whereby a magnified image is projected by the projection device 7 onto, for example, a screen (not shown).

The reflective polarizer 2 is formed of a thin-film multi-layer film, in which a plurality of A layers 2a, whose refractive indices in a predetermined direction (X-direction) and a direction perpendicular thereto (Y direction) are almost equal, and a plurality of B layers 2b, whose refractive indices in the X-direction and the Y direction are different, are alternately stacked, as shown in FIG. 1. The reflective polarizer 2 is disclosed in, for example, Japanese Unexamined Patent Publication No. 9-5006985. Furthermore, the reflective polarizer 2 is, for example, commercialized under the name of "RDF-C (Reflective Display Film-Clear)" by Minnesota Mining and Manufacturing Co. of the United States and Sumitomo 3M Ltd. of Japan, and is now available. Furthermore, the reflective polarizer 2 is disclosed as Reflective Polarizer in International Publication (WO95/17692). Such a reflective polarizer 2 is disposed so that the direction of the reflection axis is nearly aligned with the direction of polarization of a polarized light component to be reflected (s-polarized light component in the projection device 1 of this embodiment), as mentioned with reference to FIG. 1, and the thicknesses of the A layers 2a and the B layers 2b are appropriately set, which makes it possible to reflect s-polarized light components with respect to light of all the wavelengths in the visible region, and to transmit p-polarized light components.

Figure 6A:
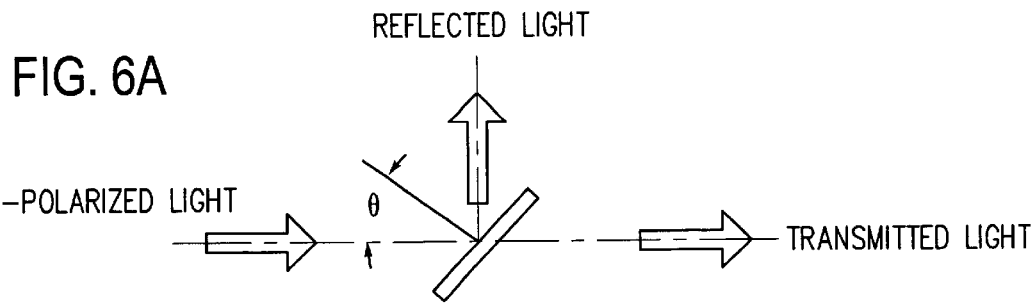
Figure 7A:
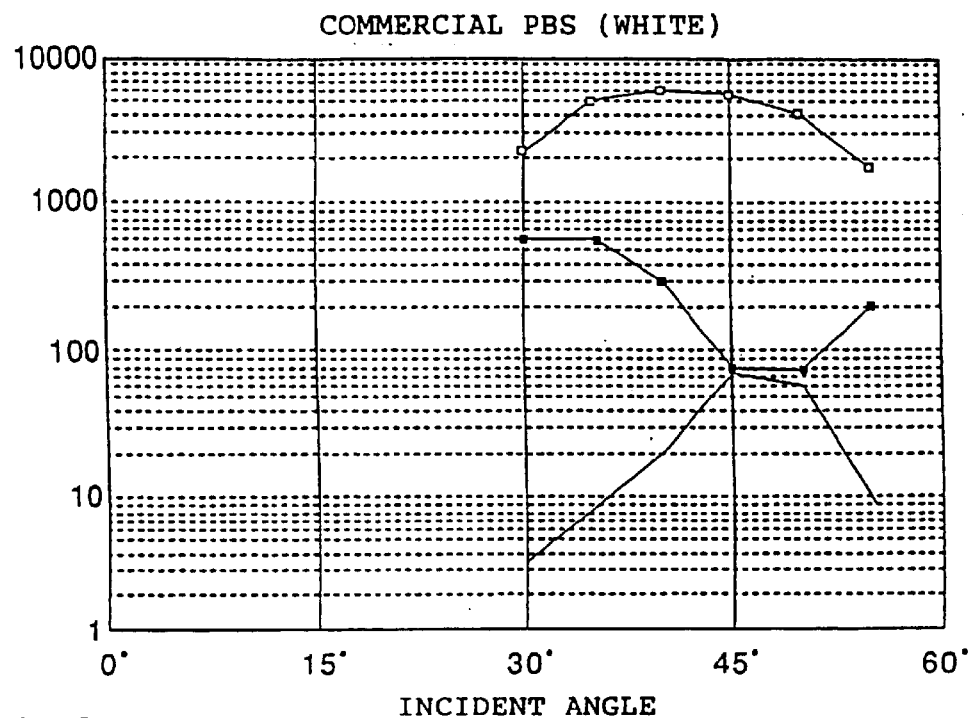
FIG. 7(a) is a graph showing in semilogarithm the reflection and transmission properties with respect to the incident angle at which an s-polarized component of white light incident on a commercial polarizing beam splitter.
Figure 7B:
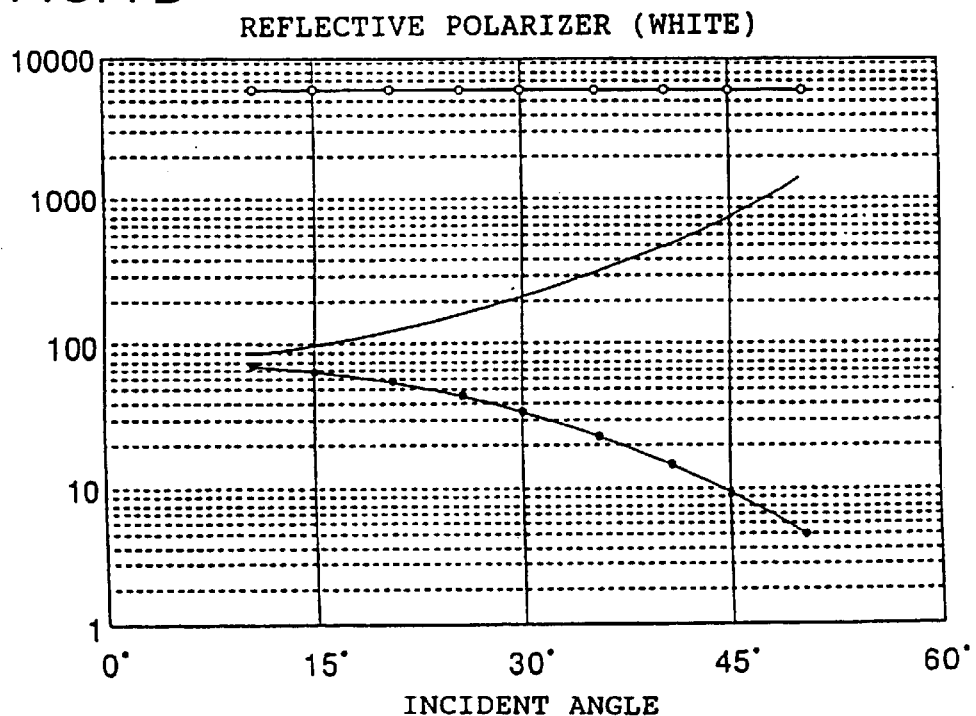
FIG. 7(b) is a graph showing in semilogarithm the reflection and transmission properties with respect to the incident angel at which the s-polarized component is incident on the reflective polarizer.
Figure 8A:
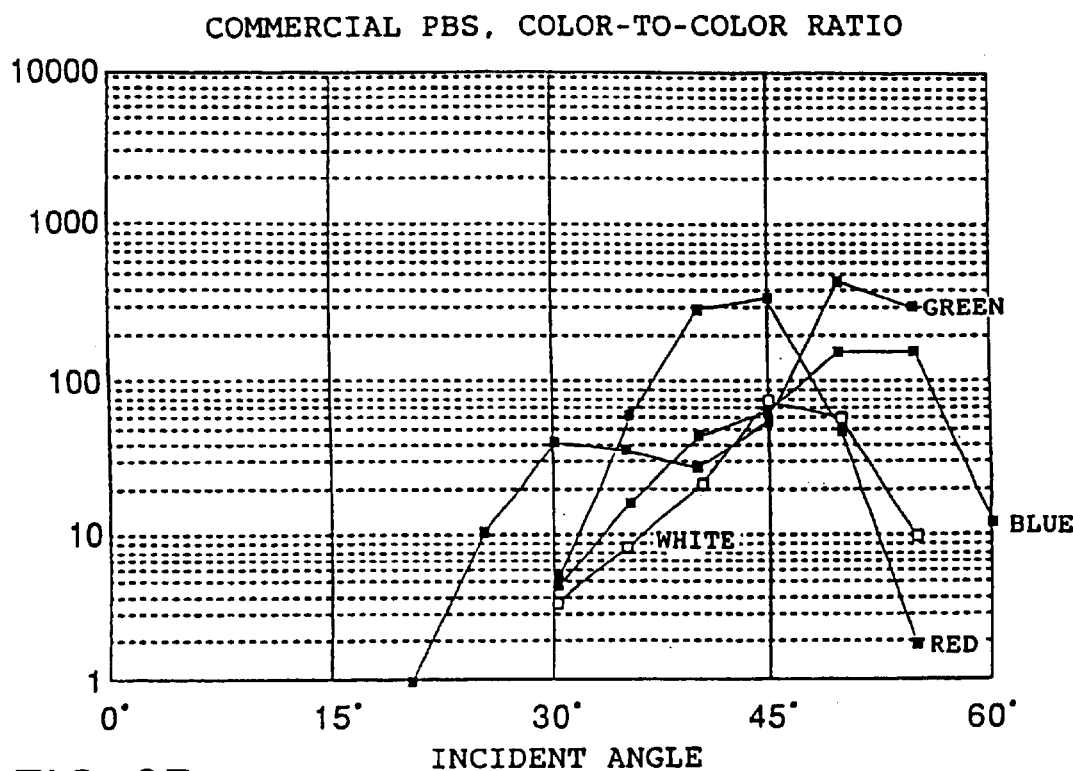
FIG. 8(a) is a graph showing in semilogarithm the ratio of amount between reflected light and transmitted light when s-polarized light components in colored lights are incident on a commercial polarizing beam splitter.
Figure 8B:
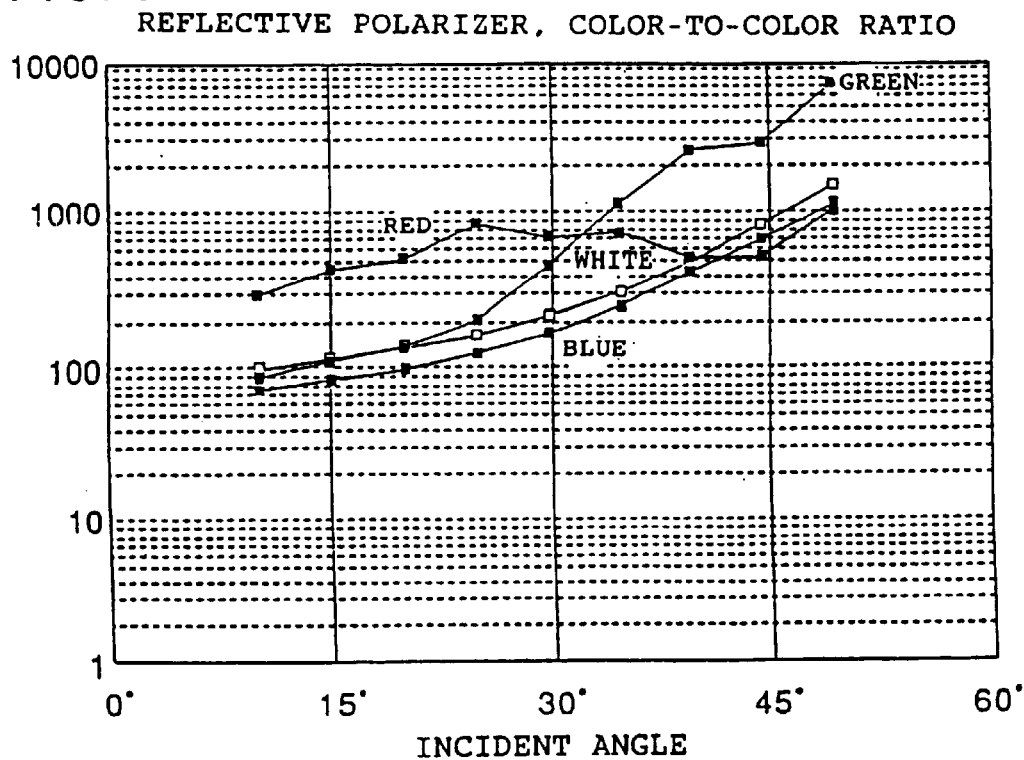
FIG. 8(b) is a graph showing in semilogarithm the ratio of amount between reflected light and transmitted light when the s-polarized light components are incident on the reflective polarizer.

FIG. 6(*a*) shows the reflection and transmission properties of a commercially available polarizing beam splitter (PBS) and the reflective polarizer 2 with respect to the incident angle of light. FIGS. 6(*b*) and 6(*c*) show the properties of the PBS and the reflective polarizer 2 that are obtained when the incident angle $\theta$ of s-polarized light shown in FIG. 6(*a*) varies at appropriate intervals. FIGS. 7(*a*) and 7(*b*) show in semilogarithun the reflection and transmission properties when s-polarized light components contained in white light are incident on the PBS and the reflective polarizer 2 at different incident angles $\theta$, and FIGS. 8(*a*) and 8(*b*) show in semilogarithm the ratio of amount between reflected light and transmitted light when s-polarized light components contained in colored lights, such as red light, are incident on the PBS and the reflective polarizer 2 at different incident angles $\theta$.

As FIGS. 6(*b*), 6(*c*), 7(*a*), and 7(*b*) reveal, when an s-polarized light component of white light is incident on the PBS and the reflective polarizer 2, the following results are obtained. Regarding the PBS, the amount of reflected light is apt to decrease and the amount of transmitted light is apt to increase as the incident angle of the s-polarized light component shifts from about 45°. That is, unless s-polarized light components are incident on the PBS at am incident angle $\theta$ of about 45°, s-polarized components to be transmitted through the PBS increase.

On the other hand, s-polarized light components that are incident on the reflective polarizer 2 are reliably reflected without depending on the incident angle thereof. This is also known from the fact that the ratio of reflected light and transmitted light in the reflective polarizer 2 is higher than the ratio of reflected light and transmitted light in the PBS.

FIGS. 6(*b*), 6(*c*), 8(*a*), and 8(*b*) also reveal that the reflective polarizer 2 exhibits a higher ratio of transmitted light to reflected light, not only in s-polarized light components of white light, but also in s-polarized light components contained in colored lights of red, green, and blue, than that of the PBS, and that the reflective polarizer 2 can thereby reliably reflect s-polarized light components contained in the incident colored lights, without depending on the incident angle θ.

In this way, the reflective polarizer 2 can reliably reflect desired linearly polarized light, namely, one of the linearly polarized lights whose polarization planes are perpendicular to each other, and reliably transmit the other linearly polarized light.

Therefore, the projection device 10 having the reflective polarizer 2 incorporated therein can prevent undesirable polarized light from being mixed into light that is to be incident on the projection device 7, which improves the contrast of a projected image.

The projection device 10 adopts the illumination device 1 including the polarization conversion unit 60, and only one type of linearly polarized light (in this case, s-polarized light) is emitted from the illumination device 1. For this reason, almost all components of randomly polarized light, which are emitted from the light source 50 in the illumination device 1, can be used as light for image formation, and this permits projection of a bright image. When a sufficiently bright projection image can be obtained without the polarization conversion unit 60, the polarization conversion unit 60 may be omitted.

As mentioned above, a reflective polarizer has the functions of transmitting only one of the linearly polarized lights and of reflecting the other linearly polarized light. Accordingly, when a reflective polarizer is disposed perpendicular to the light-source optical axis R instead of the polarization conversion unit 60 so that its reflection axis aligns with the direction of polarization of p-polarized light, s-polarized light of randomly polarized light emitted from the light source 50 passes through the reflective polarizer, and p-polarized light is reflected by the reflective polarizer and returns to the reflector 12 in the light source 50. The p-polarized light that has returned to the reflector 12 is reflected by the reflector 12, travels again toward the reflective polarizer, and is reflected again toward the reflector 12.

While the p-polarized light undergoes multiple reflection between the reflective polarizer and the reflector 12 in such a manner, it is subjected to a rotatory polarization action and thereby converted into s-polarized light. That is, randomly polarized light is converted into one type of polarized light by the reflective polarizer which is replaced with the polarization conversion unit 60, and this reflective polarizer practically functions as a polarization conversion unit. Since the reflective polarizer is formed of a thin-film multilayer film, as mentioned above, the space in which it is placed is smaller than that of the polarization conversion unit 60. Consequently, the use of a reflective polarizer as a polarization conversion unit makes it possible to minimize and downsize the optical system in a projection device in which a polarization conversion unit is incorporated.

Figure 9:
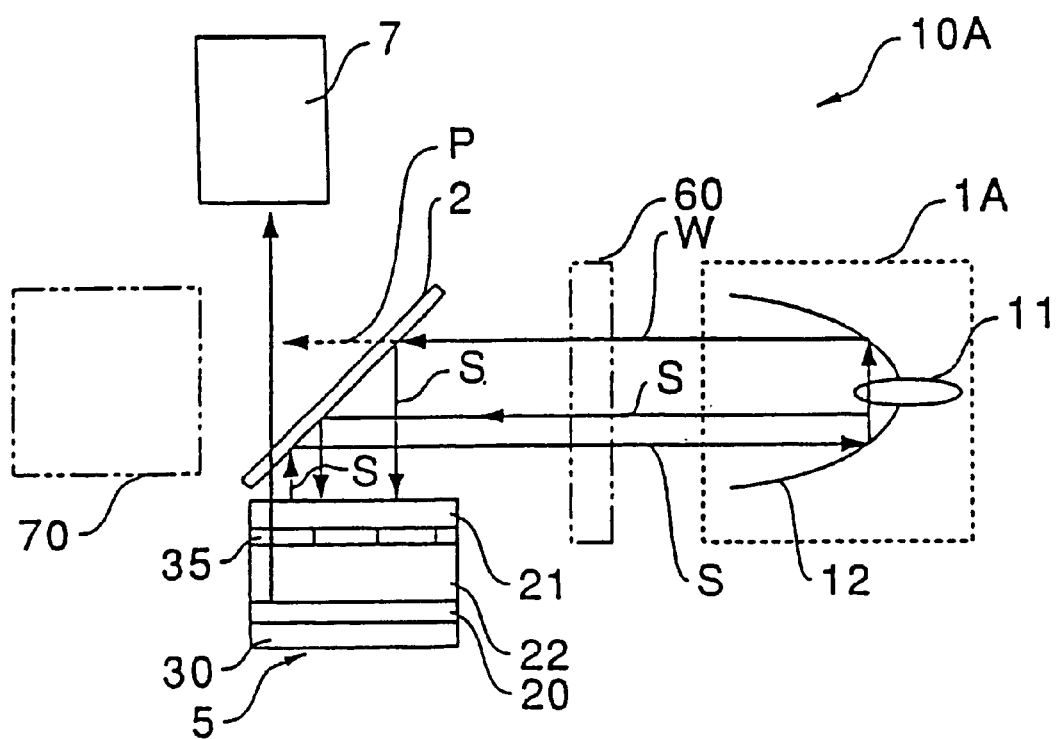
FIG. 9 is a schematic structural view of an optical system in a projection device according to a second embodiment of the present invention.

While color display is produced using three liquid crystal devices 4 to 6 in the projection device 10 according to the first embodiment, color display with a single liquid crystal device is made possible by providing the liquid crystal device 5 with a color filter. When a color filter is used, the dichroic prism 3 can be omitted. FIG. 9 shows an example of a projection device in which a liquid crystal device 5 has a color filter. In FIG. 9, components common to the projection device 10 shown in FIG. 2 are given the same numerals, and a detailed description thereof is omitted.

A projection device 10A shown in this figure includes an illumination device 1A for emitting randomly polarized light W, a reflective polarizer 2 of the aforesaid type, a reflective liquid crystal device 5 having a color filter 35, and a projection device 7 for projecting an image by projecting incident light onto a screen or the like.

The illumination device 1A has a structure in which the polarization conversion unit 60 has been omitted from the illumination device 1. That is, the illumination device 1A includes a lamp body 51 formed of a metal halide lamp or the like, and a reflector 52 for reflecting randomly polarized light radiated from the lamp body 51 and emitting the light as nearly parallel light. Randomly polarized light W reflected by the reflector 52 enters the reflective polarizer 2.

S-polarized light S of the light W that is incident on the reflective polarizer 2 is reflected, and its direction of travel is changed by 90°. In contrast, p-polarized light P is transmitted. As a result, the randomly polarized light W emitted from the illumination device 1A is separated into s-polarized light S and p-polarized light P by the reflective polarizer 2. The s-polarized light S, whose direction of travel is changed by the reflective polarizer 2, reaches the liquid crystal device 5.

Figure 10A:
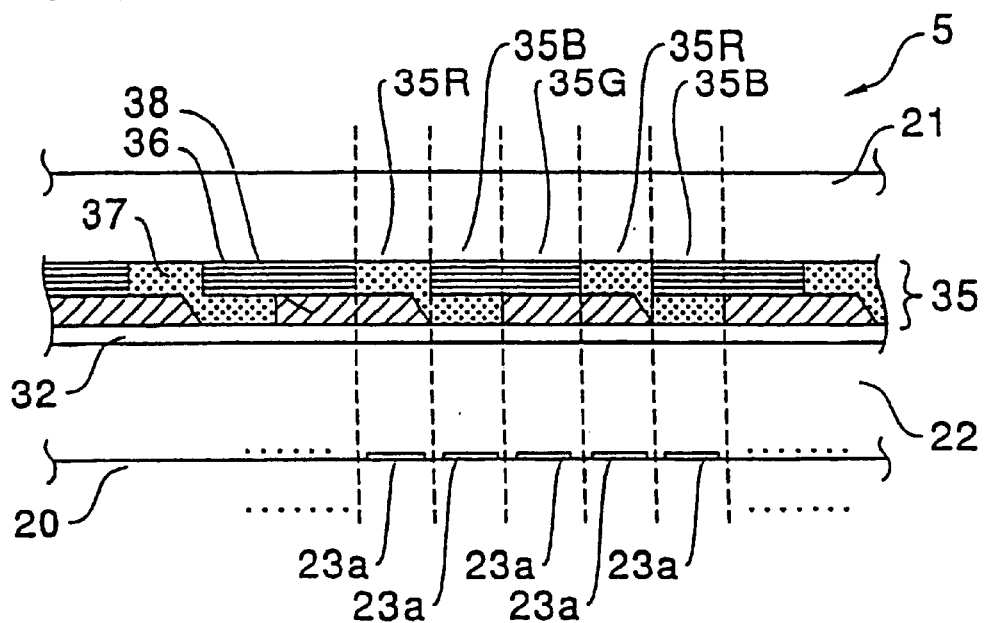
FIG. 10(a) is a schematic structural cross-sectional view of a color filter, and FIG. 10((b) is a view showing colored lights to be transmitted or reflected by the color filter.

FIG. 10(a) is a schematic structural cross-sectional view of the liquid crystal device 5 having a color filter. As this figure demonstrates, the color filter 35 is formed on the back side of a glass substrate 21 in the liquid crystal device 5, and a counter electrode 32 is formed on the color filter 35. The color filter 35 is a dichroic color filter, and includes three types of filter regions 35R, 35G, and 35B for selectively transmitting predetermined colored light that is contained in the s-polarized light S reflected by the reflective polarizer 2, and for reflecting other colored light. These filter regions 35R, 35G, and 35B are arranged corresponding to pixel electrodes 23a in a liquid crystal panel substrate 20.

In a filter region 35R, a green-light reflecting layer 37 for reflecting green light G contained in s-polarized light S and a blue-light reflecting layer 38 for reflecting blue light B contained in the s-polarized light S are formed in this order from the glass substrate 21 to a corresponding pixel electrode 23a. In a filter region 35G, a red-light reflecting layer 36 for reflecting red light R contained in s-polarized light S and a blue-light reflecting layer 38 for reflecting blue light B contained in the polarized light S are formed in this order from the glass substrate 21 to a corresponding pixel electrode 23a. In a filter region 35B, a red-light reflecting layer 36 for reflecting red light R contained in s-polarized light S and a green-light reflecting layer 37 for reflecting green light G contained in the s-polarized light S are formed in this order from the glass substrate 21 to a corresponding pixel electrode 23a.

Figure 10B:
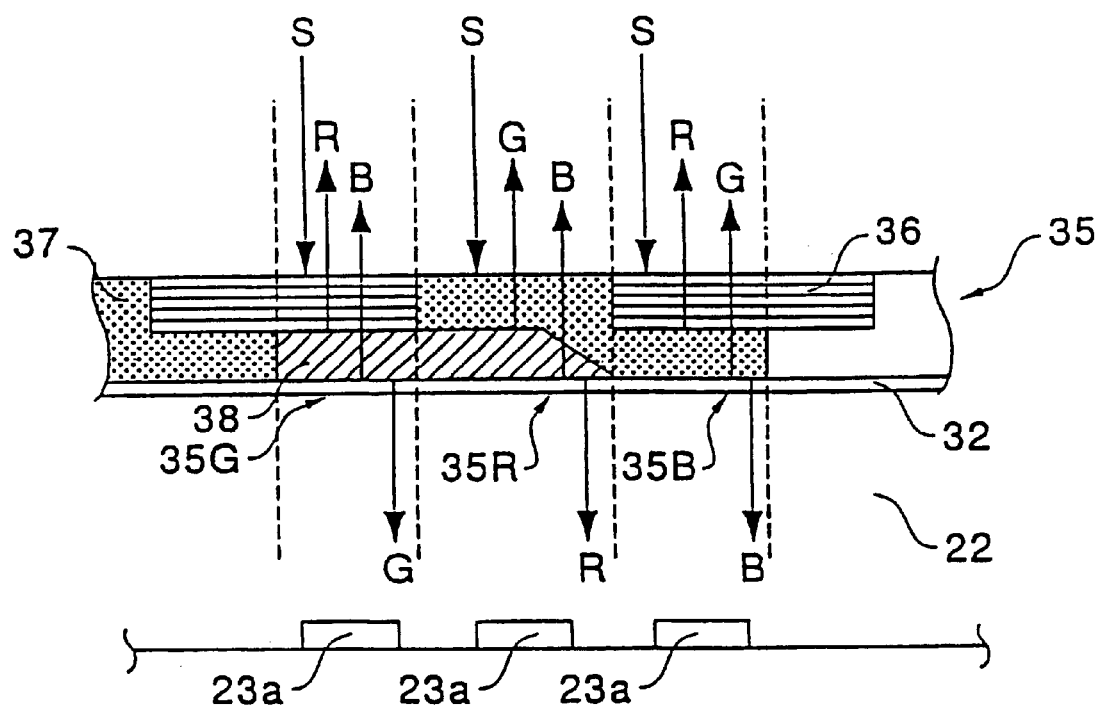

As shown in FIG. 10(b), among s-polarized light S that is incident on such a color filter 35, green light G of s-polarized light S, which is incident on the filter region 35R, is first reflected by the green light reflecting layer 37, and then, blue light B is reflected by the blue-light reflecting layer 38. As a result, only red light R contained in the s-polarized light S passes through the filter region 35R. Red light R of s-polarized light S that is incident on the filter region 35G is first reflected by the red-light reflecting layer 36, and then, blue light B is reflected by the blue-light reflecting layer 38. As a result, only green light G contained in the s-polarized light S passes through the filter region 35G. Further, red light R of s-polarized light S, which is incident on the filter region 35B, is first reflected by the red-light reflecting layer 36, and then, green light G is reflected by the green-light reflecting layer 37. As a result, only blue light B contained in the s-polarized light S passes through the filter region 35B.

The colored lights R, G, and B passing through the filter regions 35R, 35G, and 35B are reflected by the pixel electrodes 23a, pass again through the corresponding filter regions 35R, 35G, and 35B, and travel toward the reflective polarizer 2. The colored lights R, G, and B travelling toward the reflective polarizer 2 have been converted into p-polarized light P with the polarization directions thereof changed corresponding to red, green and blue images when passing through a liquid crystal layer 22, or remain s-polarized light S without changing the polarization directions.

When the colored lights R, G, and B reach the reflective polarizer 2, only p-polarized light P contained therein passes through the reflective polarizer 2, reaches the projection device 7, and is magnified and projected onto a screen or the like by this projection device 7. As a result, a magnified color image is projected on the screen or the like. On the other hand, s-polarized light S contained in the colored lights R, G, and B is reflected by the reflective polarizer 2, and returned to the illumination device 1A. The s-polarized light S that is returned to the illumination device 1A is reflected again by the reflector 12 in the illumination device 1A, and reaches the reflective polarizer 2 again. Since the light, which has reached the reflective polarizer 2, is s-polarized light S, it travels toward the liquid crystal device 5 after its direction of travel is changed by 90° by the reflective polarizer 2. That is, light reflected by the color filter 35 is reused as light for image formation.

A color filter commonly used in a projection device that projects a color image using a single liquid crystal device transmits only predetermined colored light, and absorbs other colored light. In contrast, the projection device 10A of this embodiment employs a dichroic color filter as the color filter 35, whereby colored light other than colored light to be transmitted is reflected by the reflective polarizer 2, and is reused as light for image formation. Therefore, it is possible to improve light utilization efficiency of the projection display device 10A compared with a projection device using a common color filter. Consequently, it is possible to project a bright color image without increasing light output of the illumination device 1A.

Of course, light utilization efficiency of the projection device 10A may be enhanced by incorporating the above-mentioned polarization conversion unit 60 into the illumination device 1A of the projection device 10A, or placing the polarization conversion unit 60 between the illumination device 1A and the reflective polarizer 2. Furthermore, a reflective polarizer may be adopted instead of the polarization conversion unit 60, as mentioned above.

Since it is impossible in practice for the polarization conversion unit 60 to have perfect polarization conversion ability, when the polarization conversion unit 60 is incorporated in the projection device 10A shown in FIG. 9, some p-polarized light components (hereinafter referred to as leakage p-polarized light P1) reach the reflective polarizer 2, and these polarized light components pass through the reflective polarizer 2. Moreover, since it is also impossible in practice for the reflective polarizer 2 to completely reflect all components of s-polarized light S, a part of the s-polarized light S that is incident on the reflective polarizer 2 (hereinafter referred to as leakage s-polarized light S1) passes through the reflective polarizer 2. If these lights, namely, the leakage p-polarized light P1 and the leakage s-polarized light S1, can be used as light for image formation, light utilization efficiency of the projection device can be enhanced.

FIG. 11 shows an example of a projection device that is able to use these lights as light for image formation. A projection device 10B shown in this figure has the same structure as that of the projection device 10A except that a light guide system 70 is disposed on the back side of a reflective polarizer 2 and that a polarization conversion unit 60 is incorporated, and therefore, the following description will be mainly given for the differing points.

The light guide system 70 comprises a reflective polarizer 71, a λ/4 phase layer 72, and a reflecting mirror 73. In the light guide system 70, the reflective polarizer 71, the λ/4 phase layer 72, and the reflecting mirror 73 are arranged in that order in the direction of travel of p-polarized light P that has passed through the reflective polarizer 2.

The reflective polarizer 71 is disposed perpendicular to the optical path of the p-polarized light P. The reflective polarizer 71 is oriented so that its reflection axis intersects the reflection axis of the reflective polarizer 2 used to separate polarized light. For this reason, the reflective polarizer 71 transmits linearly polarized light (s-polarized light S) reflected by the reflective polarizer 2, and reflects linearly polarized light (p-polarized light P) passing through the reflective polarizer 2.

Figure 11A:
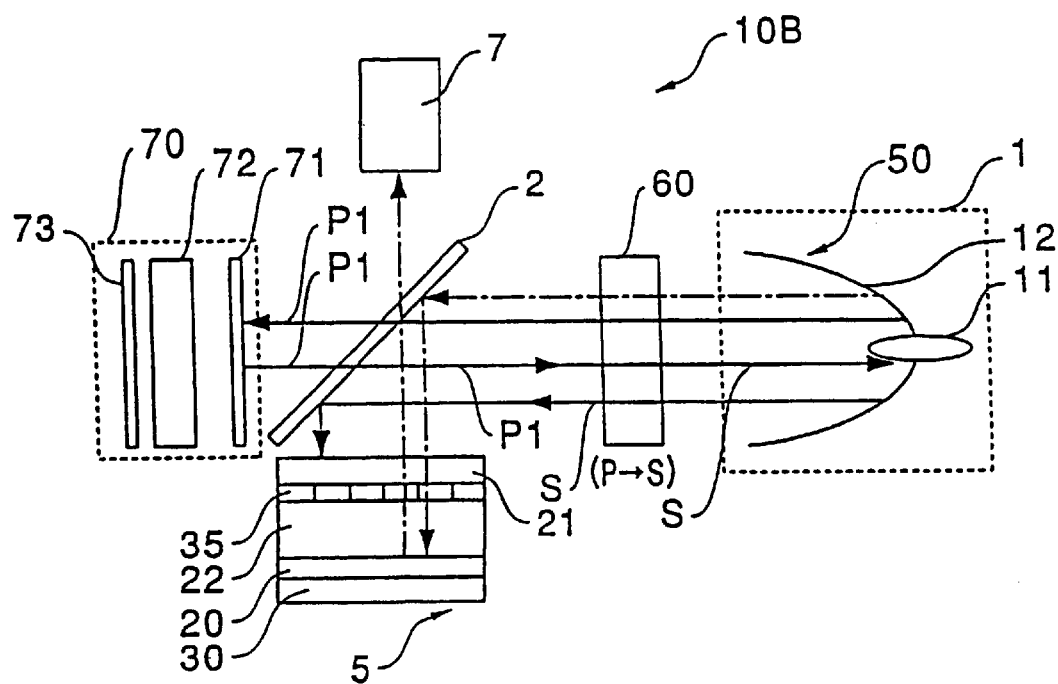
FIG. 11(a) is a view showing the principle on which leaked p-polarized light is used as light for image formation in a projection device according to a third embodiment of the present invention.

Therefore, as shown in FIG. 11(a), the leakage p-polarized light P1 that has passed through the reflective polarizer 2 enters the reflective polarizer 71 in the light guide system 70. This leakage p-polarized light P1 that is incident is reflected by the reflective polarizer 71, retraces the same optical path, and reaches the reflective polarizer 2. In order to easily understand the optical path of the leakage p-polarized light P1, the optical path before reflection and the optical path after reflection are shown by different arrows in FIG. 11(a). The leakage p-polarized light P1, which has reached the reflective polarizer 2, passes through the reflective polarizer 2, and reaches the polarization conversion unit 60. The leakage p-polarized light P1 is caused to change its direction of polarization and is converted into s-polarized light S during the process of passing through the polarization conversion unit 60. This s-polarized light S is reflected by the reflector 12 in the illumination device 1, passes again through the polarization conversion unit 60, and reaches the reflective polarizer 2. The s-polarized light S that has reached the reflective polarizer 2 is reflected toward the liquid crystal device 5. In this way, in the projection device 10B, the leakage p-polarized light P1 passing through the reflective polarizer 2 is used as light for image formation.

Figure 11B:
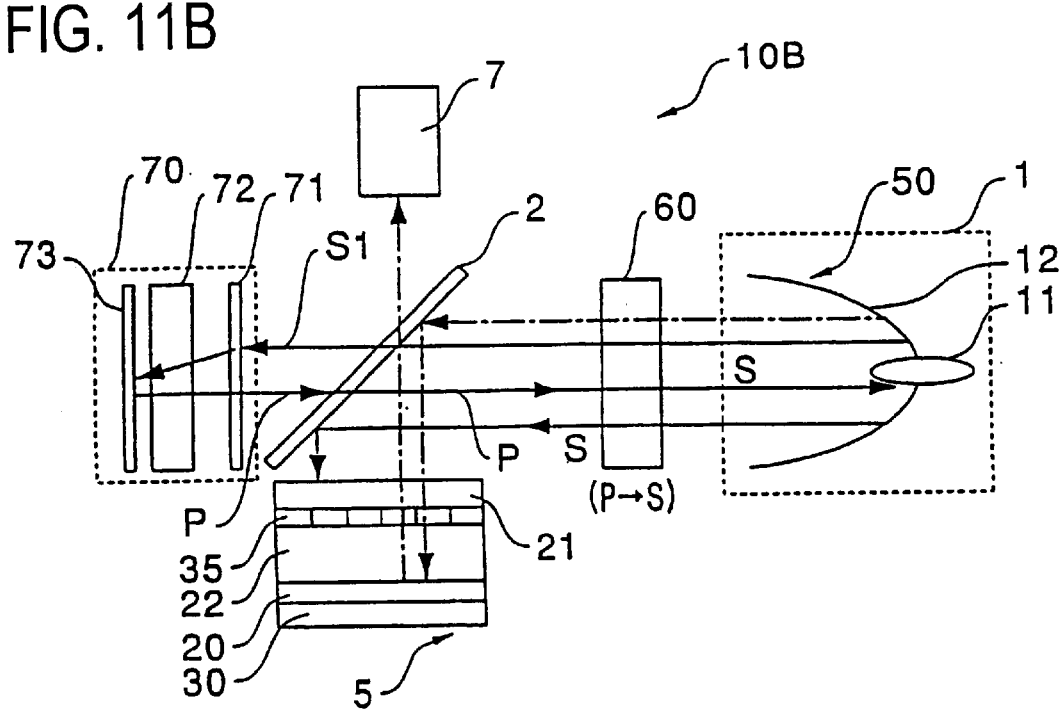
FIG. 11(b) is a view showing the principle on which leakage of s-polarized light is used as light for image formation in the projection device according to the third embodiment of the present invention.
Figure 12:
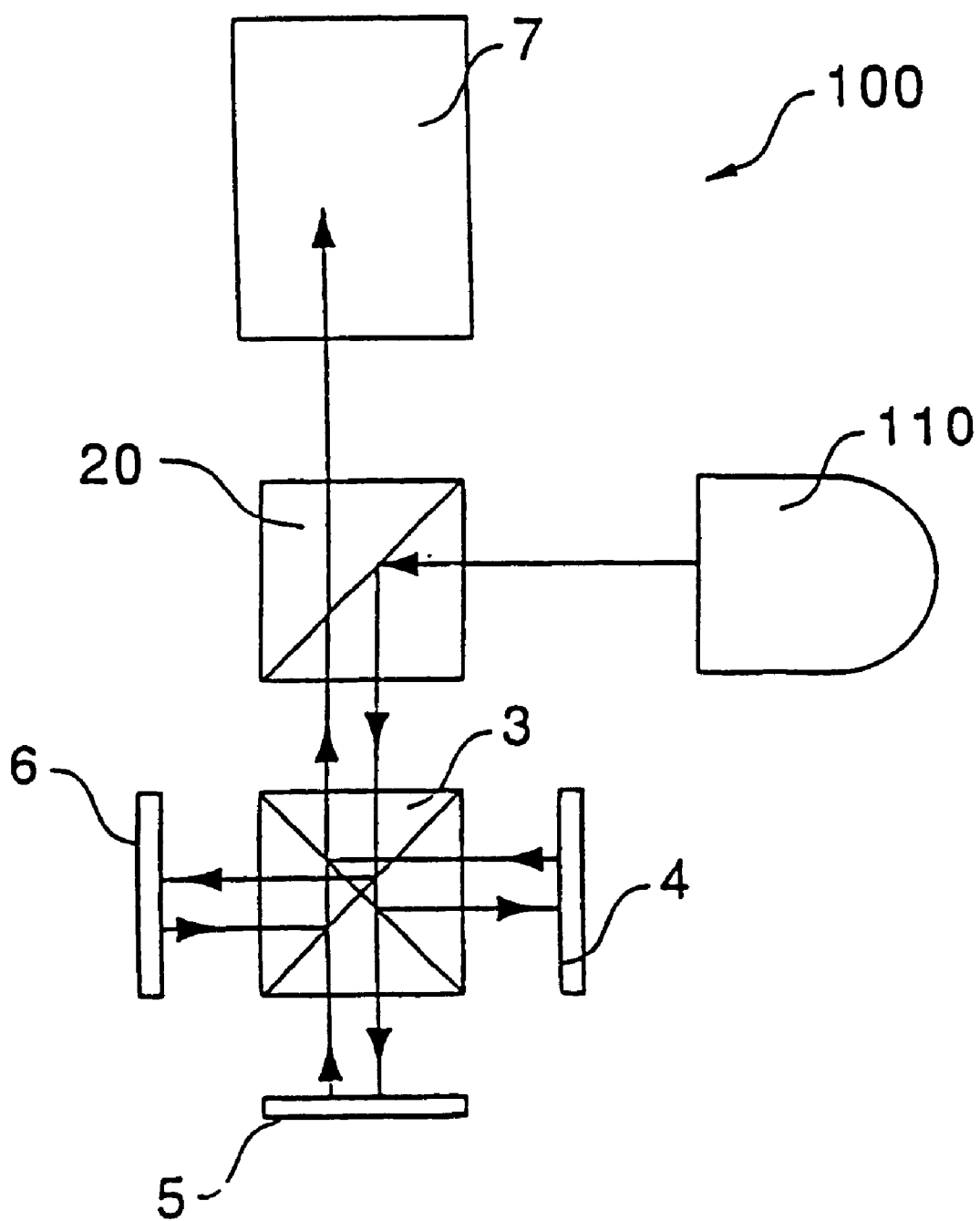
FIG. 12 is a schematic structural view of an optical system in a conventional projection device.

As shown in FIG. 11(b), the leakage s-polarized light S1 passing through the reflective polarizer 2 passes through the reflective polarizer 71 in the light guide system 70, and reaches the λ/4 phase layer 72. After passing through the λ/4 phase layer 72, the leakage s-polarized light is reflected by the reflecting mirror 73, passes again through the λ/4 phase layer 72, and enters the reflective polarizer 71. Since the leakage s-polarized light S1 passes through the λ/4 phase layer 72 twice, its polarization direction is rotated approximately 90°, whereby the leakage s-polarized light S1 is converted into p-polarized light P. For this reason, the light that is incident on the reflective polarizer 71 (p-polarized light P) passes through the reflective polarizer 71, also passes through the reflective polarizer 2, and reaches the polarization conversion unit 60. After that, this p-polarized light P is converted into s-polarized light S with its direction of polarization changed during the process of passing through the s-polarized light polarization conversion unit 60, in a manner similar to the leakage p-polarized light P1. Then, the s-polarized light S is reflected by the reflector 12 in the illumination device 1, passes again through the polarization conversion unit 60, and is reflected by the reflective polarizer 2 toward the liquid crystal device 5. In this way, the leakage s-polarized light S1 passing through the reflective polarizer 2 is also used as light for image reproduction in the projection device 10B, similar to the leakage polarized light P1.

In the projection device 10B, the leakage p-polarized light P1 and the leakage s-polarized light S1 are thus used as light for image reproduction without waste. For this reason, it is possible to enhance light utilization efficiency of the projection device 10B, and to thereby project a bright image.

While the projection device 10B employs the polarization conversion unit 60, a reflective polarizer may be used as a polarization conversion unit, as mentioned in the first embodiment. In this case, it is possible to minimize and downsize the optical system in the projection device, compared with the case where the polarization conversion unit 60 is incorporated.

The polarization conversion unit 60 in the projection device 10B may be omitted. In this case, the leakage p-polarized light P1 and the leakage S-polarized light S1 passing through the reflective polarizer 2 are reflected by the reflective polarizer 2 and guided to the liquid crystal device 5 while undergoing multiple reflection between the light guide system 70 and the reflector 12 in the illumination device 1. Therefore, the light utilization efficiency can be enhanced only by incorporating the light guide system 70. Furthermore, the optical system in the projection device can be further minimized and downsized by omitting the polarization conversion unit 60.

While all the projection devices in the above embodiments produce color display, the projection device of the present invention may be applied to a projection device that produces a monochrome display. Furthermore, of course, the light guide system 70 may be incorporated in the projection device 10 shown in FIG. 2 and the projection device 10A shown in FIG. 9.

As mentioned above, according to the projection device of the present invention, since a thin-film multilayer film (reflective polarizer) is used as a polarizing beam splitter, the polarizing splitter can reflect linearly polarized light polarized in a first direction and transmit linearly polarized light polarized in a second direction intersecting the first direction with respect to light of almost all the wavelengths in the visible region. As a result, it is possible to improve the contrast of an image to be projected.

What is claimed is:

1. A projection device, comprising:
   an illumination device;
   a polarizing beam splitter that reflects light polarized in a first direction, of light emitted from said illumination device;
   a polarization direction changing element that reflects the light polarized in the first direction and reflected by said polarizing beam splitter, back toward said polarizing beam splitter while changing the polarization direction thereof, the polarization direction being changed according to an image to be projected,
   said polarizing beam splitter transmitting light polarized in a second direction, of light reflected by said polarization direction changing element; and
   an optical system that magnifies and projects the light reflected by said polarization changing element and passing through said polarizing beam splitter,
   said polarizing beam splitter being a thin-film multilayer film composed of a plurality of first layers and a plurality of second layers alternately stacked, a first refractive index of said first layers in the first direction and a second refractive index of said first layers in the second direction being almost equal to each other, and a third refractive index of said second layers in the first direction being different from a fourth refractive index of the second layers in the second direction, said second refractive index and said fourth refractive index being substantially equal to each other,
   said polarizing beam splitter having a reflectivity-to-transmissivity ratio of at least 62 for the light polarized in the first direction for all lights incident on the polarizing beam splitter which have an incident angle within a range of 10 degrees to 50 degrees.

2. A projection device according to claim 1, said polarization direction changing element including a color filter that selectively transmits a predetermined colored light and reflects other colored lights.

3. A projection device according to claim 1, further comprising:
   a color separator that separates the light reflected by said polarization beam splitter into three colored lights;
   three of said polarization direction changing elements corresponding to each of the three colored lights; and
   a color synthesizer that synthesizes the colored lights reflected by said polarization direction changing elements.

4. A projection device according to claim 1, further comprising a polarization conversion element that converts lights emitted from said illumination device into light polarized in the first direction.

5. A projection device according to claim 4, said polarization conversion element being a thin-film multilayer film composed of a plurality of first layers and a plurality of second layers alternately stacked, a first refractive index of said first layers in the first direction and a second refractive index of said first layers in the second direction being substantially equal to each other, and a third refractive index of said second layers in the first direction being different from a fourth refractive index of the second layers in the second direction, said second refractive index and said fourth refractive index being substantially equal each other.

6. A projection device according to claim 1, further comprising a light guide that reflects the light passing through said polarizing beam splitter, of the light emitted from said illumination device, back to said polarizing beam splitter.

7. A projection device according to claim 6, said light guide including a thin-film multilayer film, a $\lambda/4$ phase plate, and a reflector said thin-film multilayer film of said light guide having a reflection axis disposed to intersect a reflection axis of said polarizing beam splitter, a light polarized in the second direction, of the light passing through said polarizing beam splitter being reflected by said thin-film multilayer film of said light guide, and returned to said polarizing beam splitter, and a light polarized in the first direction being converted into a light polarized in the second direction by said $\lambda/4$ phase plate and said reflector, returning to said polarizing beam splitter.

8. A projection device according to claim 1, said illumination device comprising a light source lamp and a reflector that reflect light emitted from said light source lamp to said polarizing beam splitter.

9. A projection device, comprising:
   an illumination device;
   a reflective polarizer having a plurality of first layers and a plurality of second layers alternately stacked, said first layers exhibiting a first refractive index in a first direction and a second refractive index in a second direction, said second direction being different from said first direction, said second layers exhibiting a third refractive index in said first direction and a fourth refractive index in said second direction, said first refractive index and said third refractive index being different from each other so that said reflective polarizer is capable of reflecting light emitted from said illumination device of said light polarized in a first direction;

a liquid crystal device having a liquid crystal, said liquid crystal device reflects said light reflected by said reflective polarizer while changing a polarization direction of said light, the polarization direction being changed according to a voltage applied on said liquid crystal;

said second refractive index and said fourth refractive index of said reflective polarizer being substantially equal to each other so that said reflective polarizer is capable of transmitting the light reflected by said liquid crystal device of said light polarized in a second direction; and a projection lens that magnifies and projects the light passing through said reflective polarizer of the liquid crystal device, said polarizing beam splitter having a reflectivity-to-transmissivity ratio of at least 62 for the light polarized in the first direction for all lights incident on the polarizing beam splitter which have an incident angle within a range of 10 degrees to 50 degrees.

10. A projection device according to claim 9, said liquid crystal device including a color filter that selectively transmits predetermined colored light and reflects other colored lights.

11. A projection device according to claim 9, further comprising:

a dicroic prism that separates the light reflected by said reflective polarizer into three colored lights;

three of said liquid crystal devices corresponding to each of the three colored lights; and said dicroic prism synthesizing the colored lights reflected by said liquid crystal devices.

12. A projection device according to claim 9, further comprising a polarization conversion element that converts lights emitted from said illumination device into light polarized in the first direction.

13. A projection device according to claim 12, said polarization conversion element being a reflective polarizer, said reflective polarizer having a plurality of first layers and a plurality of second layers alternately stacked, said first layers of said reflective polarizer exhibit a first refractive index in a first direction and a second refractive index in a second direction, said second direction being different from said first direction, said second layers of said reflective polarizer exhibit a third refractive index in said first direction and a fourth refractive index in said second direction, said first refractive index and said third refractive index being different from each other, and said second refractive index and said fourth refractive index being substantially equal to each other.

14. A projection device according to claim 9, further comprising a light guide that reflects the light passing through said reflective polarizer, of the light emitted from said illumination device, back to said reflective polarizer.

15. A projection device according to claim 14, said light guide comprising:

a second reflective polarizer which transmits light polarized in said first direction and reflects light polarized in said second direction;

a $\lambda/4$ phase plate that transmits light transmitted from said second reflective polarizer; and a reflector that reflects the light transmitted from said $\lambda/4$ phase plate, said $\lambda/4$ phase plate transmitting the light reflected by said reflector so that a polarization direction of the light passed through said second reflective polarizer is converted, transmitting said light to said reflective polarizer and returning the light to said illumination device.

16. A projection device according to claim 9, said illumination device comprising a light source lamp and a reflector that reflect light emitted from said light source lamp to said reflective polarizer.

17. A projection device according to claim 9, the polarization direction being changed by said liquid crystal device when the applied voltage is more that a threshold voltage of said liquid crystal.

* * * * *